(12) United States Patent
Ault

(10) Patent No.: US 6,339,608 B1
(45) Date of Patent: Jan. 15, 2002

(54) METHOD FOR BEAM STEERING COMPENSATION IN AN ULTRA-HIGH POWER LIQUID LASER

(75) Inventor: Earl R. Ault, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/691,506

(22) Filed: Oct. 18, 2000

(51) Int. Cl.[7] .................................................. H01S 3/20
(52) U.S. Cl. ............................ 372/51; 372/34; 372/75; 372/78
(58) Field of Search ............................... 372/51, 66, 69, 372/75, 34, 78

(56) References Cited

U.S. PATENT DOCUMENTS

| | | | |
|---|---|---|---|
| 3,678,410 A | 7/1972 | Kocher et al. | 331/94.5 |
| 3,717,825 A | 2/1973 | Gerlach | 331/94.5 |
| 3,931,594 A | 1/1976 | Schafer | 331/94.5 |
| 4,707,836 A | 11/1987 | Travis | 372/29 |
| 4,984,246 A * | 1/1991 | Cabaret et al. | 372/69 |
| 5,012,481 A * | 4/1991 | Casteleiro | 372/66 |
| 5,189,681 A | 2/1993 | Blaszuk | 372/95 |
| 5,311,528 A * | 5/1994 | Fujino | 372/75 |

* cited by examiner

Primary Examiner—Leon Scott, Jr.
(74) Attorney, Agent, or Firm—Eddie E. Scott; Alan H. Thompson

(57) ABSTRACT

Thermally induced distortion of the optical wavefront caused by heating of the laser media by waste heat from the excitation process and absorption of laser radiation creates optical phase errors. A system generates an error signal derived from the optical phase errors. The error signal is fed back to the power supplies driving semiconductor diodes that excite the lasing liquid thereby introducing an electrically controllable wedge into the optical cavity to correct the optical phase errors.

4 Claims, 1 Drawing Sheet

METHOD FOR BEAM STEERING COMPENSATION IN AN ULTRA-HIGH POWER LIQUID LASER

The United States Government has rights in this invention pursuant to Contract No. W-7405-ENG-48 between the United States Department of Energy and the University of California for the operation of Lawrence Livermore National Laboratory.

CROSS REFERENCE TO RELATED APPLICATIONS

Some subject matter is disclosed and claimed in the following commonly owned, copending U.S. Patent Application which is incorporated herein by reference: "Device for Wavefront Correction in an Ultra High Power Laser" by Earl R. Ault, Brian J. Comaskey and Thomas C. Kuklo.

BACKGROUND OF THE INVENTION

1. Field of Endeavor

The present invention relates to a laser system that provides high power and high beam quality and particularly to a method for beam steering compensation in an ultra-high power liquid host laser

2. State of Technology

There are many applications for ultra high power lasers. These applications include power beaming, laser guide stars, illuminators, material processing, and weapons. The type of laser incorporating the present invention utilizes a flowing lasing liquid that is optically excited to provide a powerful laser beam. Since the host is a liquid, it can be removed from the optical cavity when it becomes heated avoiding the inevitable optical distortion and birefringence common to glass and crystal hosts.

The heat in the flowing lasing liquid causes a small, but significant, change in the local index of refraction. As the lasing liquid flows, it integrates waste heat and exits the flow region at a slightly higher temperature. This difference is less than a degree centigrade but changes the optical path by many wavelengths of light. For uniform deposition of pump light, the change in index is linear causing a simple optical wedge to accumulate in the optical path.

A liquid laser is described in U.S. Pat. No. 3,717,825 to Carl Zeiss-Stiftung, Wuerttemburg, Federal Republic of Germany, patented Feb. 20, 1973. This patent includes the following description: " . . . a dyestuff laser provided with a liquid guiding chamber through which circulates a cooled laser liquid. The laser is provided with a U-shaped laser active zone formed by a light transmitting longitudinal cap into which extends a tongue forming in said cap a U-shaped zone of uniform cross section. This U-shaped laser active zone is disposed in a focal line of an elliptically shaped pump light reflector while a source of pump light is disposed in the other focal line."

U.S. Pat. No. 3,931,594 to Fritz Peter Schafer, assigned to Max-Planck-Gesellschaft zur Forderung der Wissenschaften e.V., patented Jan. 6, 1976, describes a transverse-flow cell for a laser. This patent includes the following description: "The cell of a liquid laser is defined between the rounded, parallel edges four coaxial cylinder sectors of fused quartz. The narrow gaps circumferentially bounded by the flat, converging side faces of the sectors provide conduits for rapid flow of dye liquid into and out of the cell which extend over the full axial length of the cell. The light of a flash tube is directed toward the cell through the cylindrically arcuate outer face of each sector."

U.S. Pat. No. 3,678,410 to Robert C. Kocher, Franklin K. Moore, Harold Samelson, and William R. Watson, assigned to GTE Laboratories Incorporated, patented Jul. 18, 1972, describes a transverse flowing liquid laser. This patent includes the following description: "A laser cell for a transverse flow liquid laser has an active region in the form of a rectangular prism and cylindrical input and output chambers mounted in spaced-apart relationship in the transverse direction at opposite ends of the active region. A baffle positioned in the input chamber causes the liquid to flow uniformly through the active region."

U.S. Pat. No. 5,189,681 to Paul Blaszuk, assigned to United Technologies Corporation, patented Feb. 23, 1993, describes a high powered laser with reduced optical aberration. This patent includes the following description: "a laser includes an optical cavity with opposed electrical excitation electrodes adjacent to the optical cavity extending along a portion of an optic axis. A gaseous gain medium is located in the optical cavity and has a first region at a first temperature and a second region adjacent to one of the electrodes at a second temperature. Also included is an unstable optical resonator assembly positioned within the optical cavity that has a first mirror positioned at a first end of the optical cavity that has a focus therein located along the optic axis. A second mirror is positioned opposed to the first mirror at a second end of the optical cavity. The second mirror has a focus within the optical cavity substantially at the first mirror focus. The first and second mirrors are configured to invert an optical beam transiting therebetween, thereby having the optical beam substantially avoid the second gaseous gain medium region."

U.S. Pat. No. 4,707,836 to Alan J. B. Travis, assigned to United Kingdom Atomic Energy Authority, patented Nov. 17, 1987, describes a laser control system. This patent includes the following description: "For monitoring and controlling a laser beam, sample beams are monitored for three characteristics and the three monitor outputs are used to control the beam generation. The three characteristics monitored are the transverse distribution of energy within the beam (a) under far field conditions and (b) under near field conditions, and (c) total power within a known proportion of the beam. These are employed respectively to control (a) the position of a mirror which forms part of an optical cavity within the laser structure, (b) a beam pointing element, (c) a beam expander and (d) a power supply for the laser."

SUMMARY OF THE INVENTION

Ultra high power lasers suffer from thermally induced distortion of the optical wavefront caused by heating of the laser media by waste heat from the excitation process and absorption of laser radiation. As the laser medium flows past the optical excitation source and the fluid warms, its index of refraction changes (positive or negative changes) creating an optical wedge. Thermally induced distortion of the optical wavefront caused by heating of the laser media by waste heat from the excitation process and absorption of laser radiation are corrected using the system of the present invention.

The present invention provides a laser system having an optical cavity. A lasing liquid is circulated through the optical cavity. A pumping device within the optical cavity includes power supplies driving semiconductor diodes that excite the lasing liquid. The laser pumping device produces thermally induced optical phase errors. A system is provided for correcting the thermally induced optical phase errors.

The system generates an error signal derived from the optical phase errors. A system uses the error signal to feed back to the power supplies driving the semiconductor diodes that excite the lasing liquid to introduce an electrically controllable wedge into the optical cavity to compensate for the thermally induced optical phase errors.

Additional aspects, advantages, and features of the invention are set forth in part in the following description. Various aspects, advantages, and features of the invention will become apparent to those skilled in the art upon examination of the description and by practice of the invention.

BRIEF DESCRIPTION OF THE DRAWINGS

The accompanying drawings, which are incorporated into and form a part of the disclosure, illustrate embodiments of the invention, and, together with the description, serve to explain the principles of the invention.

DETAILED DESCRIPTION OF THE INVENTION

Figure 1:
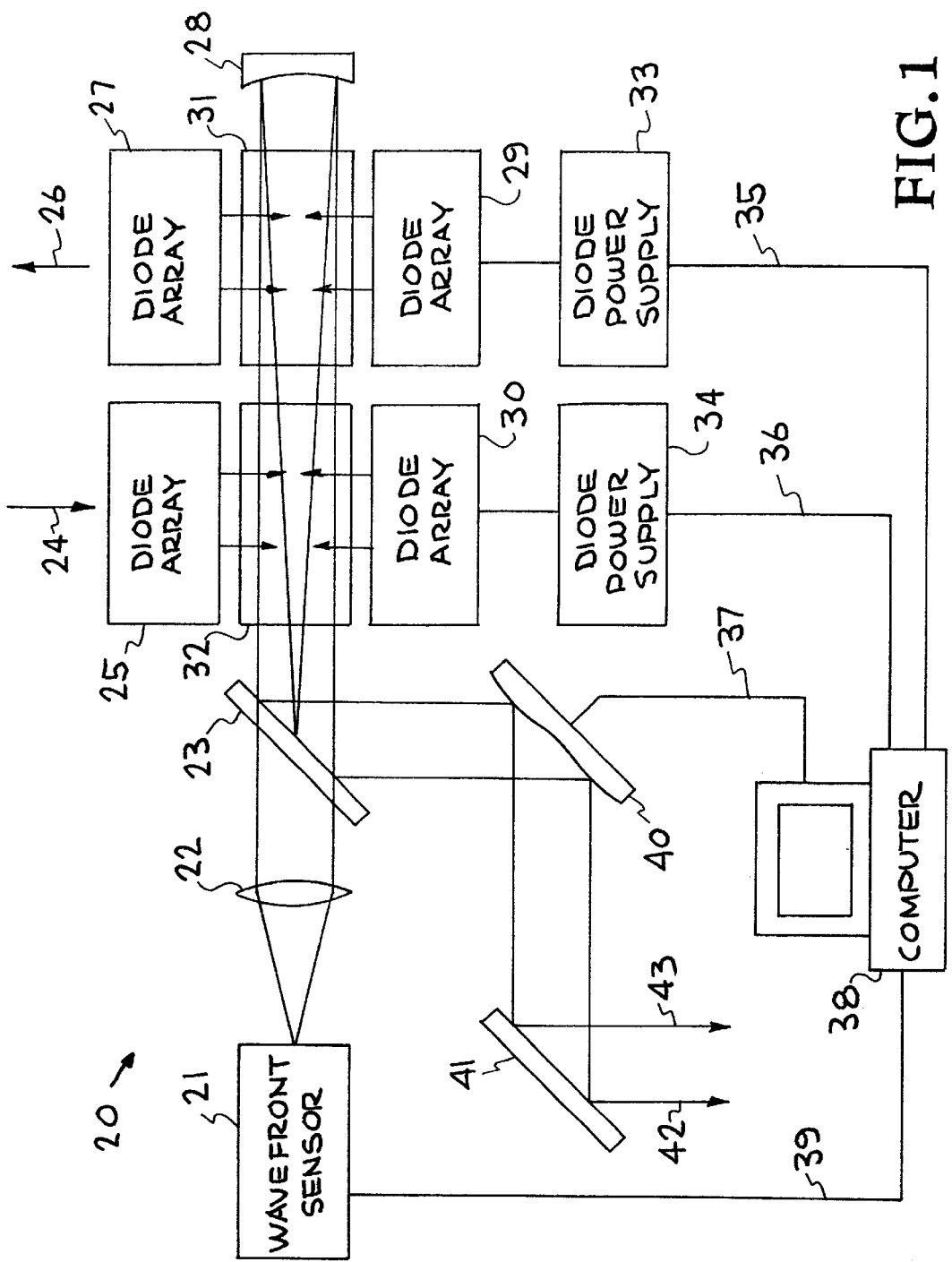
FIG. 1 illustrates an embodiment of a laser constructed in accordance with the present invention.

Ultra high power lasers suffer from thermally induced distortion of the optical wavefront caused by heating of the laser media by waste heat from the excitation process and absorption of laser radiation. As fluid flows past the windows that allow the pump radiation to enter the gain volume, it integrates waste heat and exits the flow region at a slightly higher temperature than the inlet. This difference is less than a degree centigrade, but changes the optical path by many wavelengths of light. For uniform deposition of pump light, the change in index is linear causing a simple optical wedge to accumulate in the optical path.

It is possible to deal with the problem by dividing the gain medium into two equal parts, placing them in series within the optical cavity, and arranging the flow to be in opposite directions. The resulting optical wedges are equal and opposite causing them to cancel to first order. Because of the Beer's law (exponential) nature of the pump radiation absorption, there is a second order term that does not cancel. This distortion is smaller than the original wedge and is a simple parabola in the direction transverse to the flow. The residual distortion that is not canceled, due to the Beer's law nature of the exponential absorption of the pump radiation, is removed with a special mirror that is curved into the shape of a parabola. Some of this subject matter is disclosed and claimed in the following commonly owned, co-pending U.S. Pat. Application which is incorporated herein by reference: "Device for Wavefront Correction in an Ultra High Power Laser" by Earl R. Ault, Brian J. Comaskey and Thomas C. Kuklo.

In some situations the distortions are not steady enough for good cancellation, even with an actively adjustable parabolic mirror. The present invention uses an error signal derived from wavefront errors to feed back to the power supplies driving the semiconductor diodes that excite the liquid laser medium (enclosed in two oppositely flowing fluid cells) introducing an electrically controllable wedge into the laser cavity. Nulling the wedge created by the thermal loading of the laser medium occurs in real time to affect a correction of the linear portion of the optical wedge.

Referring now to the drawings, and in particular to FIG. 1, a laser constructed in accordance with the present invention is illustrated. Two cells with opposite liquid flows are used. An embodiment of the invention uses an error signal derived from wavefront errors to feed back to the power supplies driving the semiconductor diodes that excite the liquid laser medium (enclosed in two oppositely flowing fluid cells) introducing an electrically controllable wedge into the laser cavity. Nulling the wedge created by the thermal loading of the laser medium occurs in real time to affect a correction of the linear portion of the optical wedge.

Referring again to FIG. 1, fluid flowing in opposite directions, 26 and 24, in cells 31 and 32, is optically excited by light emitted from semiconductor diode arrays 25, 27, 29, 30. When the heat loads are balanced, the optical wedge formed by the heated fluid in cells 31 and 32 cancel and the optical resonator, comprising a total reflector 28 and Scarper/Leaker mirror 23, sees no net optical wedge.

Residual wavefront errors are sampled by the focusing lens 22 and wavefront sensor 21, analyzed by the computer 38, and corrected by the deformable mirror 40, based on commands 37 from the computer 38. Subsequent reflection off the fast steering mirror 41 allows for fine correction 39 of any remaining point errors that may be introduced by the optical train ahead of it.

When a wedge error is detected by the sensor 21, two options are available to the software program in the computer. First if the error is due to an imbalance in the response to the heat load in the fluid in either cell, the software is programmed to modulate commands 35 and 36 to the power supplied by diode power supplies 33 and 34, seeking an optimum solution. Variations up to 10% in heat load have been analyzed and found to be correctable with little residual error in the final laser beam.

The second option is to move the fast steering mirror 41 to correct, 42 and 43, for pointing errors in the beam. In either case complex nested control loops are needed. These are not beyond the state of the art as demonstrated in isotope separation and astronomical applications. This can be applied to the case of a laser power amplifier. In that case mirror 23 is removed to allow passage of the signal beam into the fluid cells, and mirror 28 is a simple flat mirror with a controlled amount of leakage to the wavefront detector.

What is claimed is:

1. A laser system, comprising:
   an optical cavity,
   a lasing liquid within said optical cavity,
   a laser pumping device including power supplies driving semiconductor diodes that excite said lasing liquid within said optical cavity, said laser pumping device producing thermally induced optical phase errors,
   a circulation system for circulating said lasing liquid into and out of said optical cavity,
   a system for generating an error signal derived from said optical phase errors, and
   a system using said error signal to feed back to said power supplies driving said semiconductor diodes that excite said lasing liquid to introduce an electrically controllable wedge into the optical cavity to correct said thermally induced optical phase errors.

2. The laser system of claim 1 including a deformable mirror to introduce an electrically controllable wedge into the optical cavity to correct said thermally induced optical phase errors.

3. A lasing method comprising:

providing a flowing lasing liquid in an optical laser cavity;

using power supplies driving semiconductor diodes to optically exciting said flowing lasing liquid to provide a laser beam, thermally induced optical phase errors being thereby produced;

detecting said thermally induced optical phase errors; and correcting said thermally induced optical phase errors by generating an error signal from said detected optical phase errors and using said error signal to feed back to power supplies driving semiconductor diodes to introduce an electrically controllable wedge into the optical cavity to correct said thermally induced optical phase errors.

4. The lasing method of claim 3 wherein a deformable mirror is used to introduce an electrically controllable wedge into the optical cavity to correct said thermally induced optical phase errors.

* * * * *